March 6, 1945. S. MILANO 2,371,061
METHOD OF MAKING DIES
Filed Sept. 10, 1941
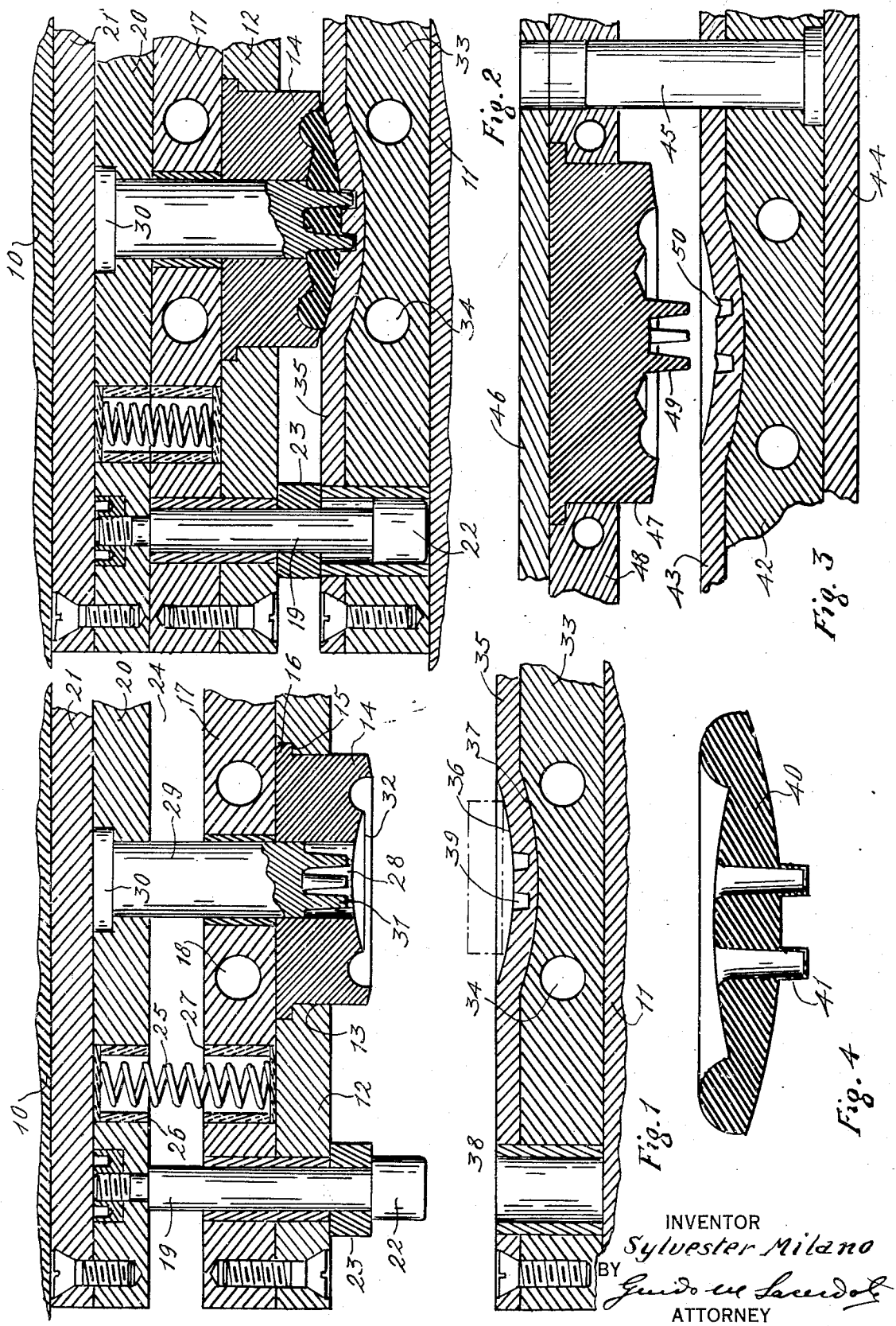
INVENTOR
Sylvester Milano
BY
ATTORNEY Patented Mar. 6, 1945

2,371,061

UNITED STATES PATENT OFFICE 2,371,061

METHOD OF MAKING DIES

Sylvester Milano, Federalsburg, Md., assignor to Maryland Plastics, Inc., Federalsburg, Md., organized in Maryland Application September 10, 1941, Serial No. 410,311

3 Claims. (Cl. 76—107)

This invention relates to the art of manufacturing buttons and other articles from thermoplastic and thermosetting materials, and more particularly refers to a novel and improved method of making a die for molding buttons and other articles, provided with holes extending through the body of the article.

Articles made from plastic materials are usually made by subjecting the material to the simultaneous action of heat and pressure while confining it between two sections of a die together forming a suitably shaped cavity determining the shape of the finished product.

In the art of molding articles such as buttons it is customary to provide these dies with pins penetrating the plastic mass to form thread holes at the same time that the material is subjected to the action of heat and pressure. The buttons are thus molded complete in one operation and the necessity of subjecting them to subsequent drilling operations is avoided.

According to one of the methods heretofore in use, both sections of the die are provided with pins so arranged that when the die sections are closed the ends of these pins will about meet in the middle of the mold for forming the holes in the finished button.

By forming the holes by means of pins inwardly projecting from the two opposite surfaces of the button it becomes possible to produce such holes so that they will be flaring at both ends.

However, when the two sets of pins provided in the sections of the die come together they will squeeze between them thin films of plastic material which must be removed by a subsequent operation in order to provide a through passage for the thread, and this operation materially increases the cost of production.

In order to overcome this objectionable feature it has been proposed to use dies in which the thread hole forming pins are provided in one section of the die only, said pins being of a length substantially corresponding to the thickness of the button to be produced, the result being a button provided with tapered thread holes blocked at the smaller end by a very thin, easily breakable, film which must be removed in order to provide through passages for the thread.

Although this type of die is much easier and less costly to produce than a die in which half length pins are provided in each section, it has been my experience that due to the fact that the aforesaid thin films of plastic material do not project from the surface but actually provide a smooth continuity for said surface, tumbling operations will rarely be sufficient to remove them. On the other hand, if drilling or punching operations are resorted to, the cost of the product will be considerably increased, so that in practice this method does not possess any real advantage over the one previously mentioned.

In another application for patent entitled Methods of and apparatus for producing plastic articles, Serial No. 410,310, filed simultaneously herewith, I have described and claimed a novel and improved method of molding buttons and other articles, whereby said articles are formed with easily breakable thin pockets extending therefrom in correspondence of the thread or other holes, said pockets being easily removable by subjecting the articles to tumbling in a step following the molding operation.

In said application I have also described a type of die well adapted for producing such articles, the die also preferably embodying certain improvements forming the subject of another application for patent entitled Methods of producing molded plastic articles, Serial No. 410,308, also filed simultaneously herewith.

Said die is composed of two sections, together forming the button cavity, and a punch provided with pins going through the body of the plastic mass to form the thread holes, while the material is in a plastic condition.

In order to produce the aforesaid pockets the length of the pins is materially greater than the thickness of the body of the button, so that in operation said pins will extend within corresponding cavities provided in the opposite section of the die.

Due to the necessity of matching with extreme precision the location of the pins and corresponding cavities, the building of such dies requires great care and skill, especially in view of the fact that a considerable number of die sets are mounted in die plates to form multiple dies, making it possible to produce a large number of articles such as buttons at one operation. These dies are, therefore, very expensive and must be handled with great care.

The primary object of the present invention is to provide a novel and improved method of producing a die for molding buttons and other articles, whereby the building of the die may be greatly simplified and a material saving in its cost may be effected.

Another object is to provide a novel and improved method of making die for producing buttons and other articles, having holes extending through the body thereof, the holes being produced by pins extending through and beyond the body of the article, the construction of the die, however, being simplified so as to avoid the necessity of separately producing a section provided with cavities registering with thread hole producing pins.

Other objects and advantages of the present invention will more fully appear as the description proceeds and will be set forth and claimed in the appended claims.

My invention is illustrated by way of example in the accompanying drawing, in which:

Fig. 1 is a fragmentary sectional view of a die embodying my invention, with its two sections apart ready to be moved to their closed position;

Fig. 2 is a similar view showing the various parts of the die after its two sections have reached the closed position and the thread hole producing pins have penetrated through the mass;

Fig. 3 is a fragmentary sectional view of a simple type of die, also embodying my invention; and Fig. 4 is a cross sectional view, in an enlarged scale, of a button produced by the die shown in Figs. 1 and 2.

Referring to Figs. 1 and 2, 10 designates the stationary upper plate and 11 the movable lower plate of a hydraulic press, such as is ordinarily employed in plastic manufacture.

The die proper comprises a lower section fixed on the movable plate 11 and an upper section consisting of a stationary portion fixed to the upper plate 10 and a floating portion carried by guiding pins depending from said stationary portion, said guiding pins acting as suspension members for said floating portion.

The floating portion of the upper section of the die comprises a retaining plate 12 provided with a number of housings 13, each adapted to snugly receive a unit die mold or section 14. The upper end of the housings 13 has an enlarged diameter to provide a peripheral shoulder 15 and the unit die sections are correspondingly provided with a peripheral flange 16 registering with said shoulder and acting to retain the unit die section in position.

Said floating portion further comprises a backing plate 17 secured to the retaining plate 12, said backing plate being provided with steam passages 18, maintaining the upper die section at the required temperature.

As stated, said die portion 12—17 is floatingly carried by guiding pins 19 depending from a punch retaining plate 20, forming part of the stationary portion of the upper die section, said stationary portion also comprising a backing plate 21 interposed between said retaining plate 20 and the press plate 10.

The guiding pins 19 extend downwardly from said plate 20 and are formed with a lower head portion 22, having an enlarged diameter and forming a rest for a spacing bushing 23 interposed between said head and the retaining plate 12. The weight of the floating portion 12—17 will normally hold said portion in its lower position, in which it is supported by the spacing bushings 23 and is spaced a certain distance from the plate 20, as indicated at 24.

However, in practice, I prefer to also provide springs, such as 25, interposed between the stationary and floating portions of the upper die section, said springs serving to gradually increase the working pressure when the floating portion 12—17 is forced against the stationary plate 20.

Said springs are preferably encased in heat insulating housings 26, 27, in order to prevent their being adversely affected by the action of heat.

The unit die section 14 is provided with an opening 28 in which extends a punch 29 depending from the stationary portion of the upper section of the die, said punch being retained in position by an enlarged head 30 registering with a suitable opening formed in the retaining plate 20. At the lower end said punch 29 is formed with a cluster of thread hole forming pins 31, integral therewith and extending downwardly therefrom, said pins normally clearing the mold cavity 32 formed in the unit die section.

The length of said pins 31 is greater than the thickness of the body of the button to be formed by the die so that when the two sections of the die are brought together, said pins will project through and beyond the plastic mass.

Dies such as are ordinarily employed in this type of work, such as for instance, as I have described and claimed in my other co-pending application entitled Methods of and apparatus for producing plastic articles, Serial No. 410,310, above referred to, usually comprise sets of two unit die sections together forming the mold in which the button is formed, one of the unit sections being formed with recesses adapted to receive the projecting portion of the thread hole forming pins extending through the other unit section.

As previously stated, the extreme precision required in producing these dies renders them very expensive and it is, therefore, desirable to reduce their cost if possible. This I do by avoiding the necessity of providing separately machined unit die sections having recesses exactly registering with the thread hole producing pins above mentioned.

To this end, I line the lower section of the die with a plate made of a metal having a softer texture than that of the hardened thread hole forming pins, so that when said pins are pressed against said plate lining they will bite into it and form recesses and cavities which will naturally exactly register with said pins. At the same time, the metal out of which the plate lining is made must be sufficiently hard to act as part of the button mold when the die is in production, the recesses therein formed by the thread hole forming pins permanently retaining their shape.

In practice, I have found that a plate of cold rolled steel will serve the purpose very nicely. The lower section of the die accordingly comprises a bed plate 33, provided with steam passages 34, fixed onto the lower press plate 11, and a plate lining 35, preferably made of cold rolled steel or some other metal having suitable characteristics, fixed to the top of said bed plate 33.

Said plate lining is embossed to form cavities or depressions 36 directly opposite the unit die sections 14, said depressions having a suitable shape to enable them to cooperate with the cavity 32 of the unit die sections 14 in molding the button.

The bed plate 33 is in its turn machined to form depressions 37 registering with the bulging portions of the plate lining, due to the formation of the cavities or depressions 36, so that the plate lining will snugly fit the upper surface of the bed plate 33 and will be supported thereby throughout the entire surface thereof.

The resulting lower die section is provided with bushings, such as 38, registering with the enlarged head 22 of guiding pins 19, said bushings serving the purpose of properly aligning the die sections when the lower die section is forced upwardly against the upper die section by the action of the press.

When the die is originally produced the lower section is placed on the press plate 11 and the press is then operated to raise the lower die section towards the upper section. When the upper surface of the lower die section comes in contact with the unit die sections 14, the floating portion of the upper section will be forced upwardly until the thread hole forming pins will emerge from the opening 28 and will gradually reach and force themselves into the surface of the plate lining 35, forming therein the cavities or recesses 39.

After such smoothing and finishing operations as may subsequently be required to complete the lower section, the die is ready for operation in the normal manner.

In a preferred method of producing the die after the recesses have been formed by pressing the two sections together, the plate lining of the lower section is subjected to some suitable hardening process; for instance, when cold rolled steel is used its surface may be case-hardened in any suitable manner so that the working surface of the lower die section will become practically as hard as the working surface of the upper die section.

When the die is in the open position, shown in Fig. 1, the previously prepared tablets of plastic material are placed within the lower unit die sections, as shown at 42. Said tablets are produced by means of a special machine delivering them in compressed solid form so that they can be easily and speedily handled. The press is then operated to slowly raise the lower die section towards the upper section while the tablets of plastic material are gradually reduced to a plastic condition by the heat transmitted from the steam passages to the unit die sections.

When the upper surface of the tablet comes in contact with the surface of the unit die section 14, if the tablet has not yet softened to a material degree, the floating portion of the upper section will be forced upwardly a certain distance, and by the time the plastic material has finally become fused or sufficiently plastic it will begin to take shape between the two sections of the die and the thread hole forming pins will begin to project through the plastic mass.

The lower section of the die will continue to rise forcing the floating portion 12—17 upwardly against the action of springs 25, the pressure from the lower to the upper section being transmitted through spacing bushings 30 so as to relieve the unit die sections of any extra pressure. It is to be understood that to this end the thickness of bushings 23 corresponds to the distance separating the lower surface of the unit die section 14 from the lower surface of retaining plate 12.

As the floating portion of the upper section continues to move towards plate 20, pin portions 31 of punches 29 will gradually pass through the body of plastic material and when the backing plate 17 finally comes to abut against retaining plate 20, as shown in Fig. 2, the pin portions 31 will have formed the thread holes in the button and their lower ends will extend within recesses 39 of the lower die section.

The resulting button 40, shown in Figs. 2 and 4 will be formed with thin walled pockets 41, extending from the body thereof in correspondence of the thread holes, as explained in my co-pending application entitled Methods of and apparatus for producing plastic articles, Serial No. 410,310, above referred to. Said pockets are easily breakable and due to the fact that they project from the surface of the button they can be quickly removed by a subsequent tumbling operation.

It will be observed that by adopting the double-action type of die described, the thread hole forming pins cannot be forced through the molding material until such material has reached a sufficiently plastic state. The press piston moves at a relatively slow pace so that after the tablets of molding material have become clamped between the two unit die sections there is ample time for such material to become fused or plastic before the thread hole forming pins are actually forced through it. As a result of the conditions thus created the plastic material can be formed exactly to shape and pressed about the thread hole forming pins without danger of breakage or cracking, and a perfectly smooth product of uniform texture is obtained.

However, it is to be understood that although the die illustrated and described in Figs. 1 and 2 represents the preferred practice, it is within the scope of my invention to use dies of the usual type in which the thread hole forming pins are directly fixed to the unit die section. As stated, the use of such dies, if proper precautions are not taken, may lead to an abnormal amount of wastage, but if the molding material tablets are pre-heated before being placed in the die they may have reached a sufficient state of plasticity by the time the two die sections come together and a satisfactory product may be obtained.

Thus, in Fig. 3 I show a die in which the lower section is substantially similar to that shown in Fig. 1, said lower section comprising a bed plate 42, a plate lining 43, and a backing plate 44 held in position by the guiding pin 45. The upper section of the die comprises a backing plate 46, a unit die mold or section 47 and a retaining plate 48 for said unit die mold.

It will be observed that in this case the die mold 47 is formed integral with thread hole forming pins 49. Like in the previous case, the plate lining 43 has cavities 50, which may be formed into it by forcing the two die sections together, as previously explained.

The constructional details of my invention may vary somewhat from those shown without departing from the inventive idea; the drawing should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. In a method of producing a sectional mold for molding plastic articles, such as buttons, provided with holes extending through the entire thickness thereof, one of the sections of the mold being provided with hole forming punches, and the other section being provided with recesses registering with and adapted to receive the tip end of said punches to form thin frangible hollow projections over the ends of the holes at one side of the buttons, the steps which consist in forming said recesses by covering the surface of the section to be recessed with a plate of metal soft enough to be impressed by said punches, forcing said two sections together to their closed position, thereby causing said punches to penetrate said softer plate and generate said recesses, and then hardening the surface of said softer plate.

2. The method of producing a sectional mold for molding plastic articles, such as buttons, provided with holes extending through the entire thickness thereof, one of the sections of the mold being provided with hole forming punches with tapered ends adapted to pass through a button and project beyond the opposite side thereof, and the other section being provided with recesses registering with and adapted to receive the tapered ends of said punches to form thin hollow frangible projections over the ends of the holes at one side of the buttons, which method comprises lining the surface of said other section with a layer of metal soft enough to be recessed by said punches, forcing said two sections together thereby causing the tapered ends of the punches to penetrate said relatively soft layer to form recesses therein, said punches being forced further into said layer than in a normal molding operation so that there will be a space about the ends of the punches and the sides and bottoms of the recesses to form hollow projections about the ends of the buttonholes in a normal molding operation, and then hardening the surface of said metal layer.

3. The method of producing a sectional mold for molding plastic articles such as buttons, provided with holes extending through the entire thickness thereof, one of the sections of the mold being provided with hole forming punches with tapered ends adapted to pass through a button and project beyond the opposite side thereof, and the other section being provided with recesses registering with and adapted to receive the tapered ends of said portions to form thin hollow frangible projections over the ends of the holes at one side of the buttons, which method comprises covering the surface of said other section with a layer of cold rolled steel soft enough to be recessed by said punches, and forcing said two sections together thereby causing the tapered ends of the punches to penetrate said layer of cold rolled steel to form recesses therein, said punches being forced further into said layer than in a normal molding operation so that there will be a space about the ends of the punches and the sides and bottoms of the recesses to form hollow projections about the ends of the buttons in a normal molding operation.

SYLVESTER MILANO.